United States Patent [19]
Allison

[11] 3,887,026
[45] June 3, 1975

[54] MOTOR VEHICLE POWER STEERING DEVICE

[75] Inventor: William D. Allison, Grosse Pointe Farms, Mich.

[73] Assignee: Ford Motor Company, Dearborn, Mich.

[22] Filed: Sept. 24, 1973

[21] Appl. No.: 400,439

[52] U.S. Cl. .................... 180/79.2; 91/427
[51] Int. Cl. ............................. B62d 5/08
[58] Field of Search .............. 180/79.2 R, 79.2 F; 91/427

[56] References Cited
UNITED STATES PATENTS
2,859,592  11/1958  Mercier .................. 180/79.2 R X
FOREIGN PATENTS OR APPLICATIONS
1,196,974  7/1965  Germany .................. 180/79.2 R
163,908  11/1964  U.S.S.R. .................. 180/79.2 R Primary Examiner—David Schonberg
Assistant Examiner—John A. Pekah
Attorney, Agent, or Firm—Clifford L. Sadler; Keith L. Zerschling

[57] ABSTRACT

The present invention relates to a power steering device for a motor vehicle and, more particularly, to a steering gear actuator having a pair of drive chains connecting a pair of input sprockets that rotate with the vehicle's steering wheel and a pair of output sprockets that are connected to the pinion of a rack and pinion steering gear. A chain tensioner engages the chains and is constructed to actuate the power steering valve of a power steering system in response to the transmission of a load through the chains. Displacement of the valve initiates a power assist to the turning of the steering wheel by the vehicle operator. The power steering valve includes a normally stationary sleeve valve element that is linked to a manual control convenient to the vehicle operator for direct operation of the power steering system to provide a full power steering capability.

2 Claims, 9 Drawing Figures 3,887,026

MOTOR VEHICLE POWER STEERING DEVICE

BRIEF SUMMARY OF THE DISCLOSURE

The present invention relates to a power steering system for a motor vehicle and, more particularly, to a power steering system having a drive chain that transmits steering torque from the vehicle's steering wheel to the pinion of a rack and pinion steering gear. A chain tensioner senses chain loading and operates a power steering valve of a power steering system. A direct mechanical connection to the power steering valve is also provided for full power operation of the steering system. This latter construction feature is useful during vehicle parking.

The preferred embodiment of the present invention includes a steering gear actuator comprising a pair of chain sprockets connected to a steering wheel. A second set of chain sprockets is connected to the pinion of a rack and pinion steering gear. A pair of roller type chains drivingly interconnect the two pairs of sprockets. A resiliently mounted chain tensioner engages portions of the drive chain extending between the sets of sprockets. The chain tensioner functions to control slack in the chains. The chain tensioner is also constructed to be displaced laterally when a steering load is transmitted through the chains from one set of sprockets to the other.

A power steering valve is provided and includes a sleeve valve element and a spool valve element. The power steering valve is connected to a fluid pressure source and a power steering booster cylinder.

The power steering valve engages the chain tensioner and is arranged to have its spool valve element displaced in response to the displacement of the chain tensioner. When the steering wheel is rotated manually by the vehicle operator for steering purposes, the load on the drive chains interconnecting the two pairs of sprockets is sensed by the chain tensioner and the tensioner is displaced thereby. The spool valve element of the power steering valve is shifted by the displacement of the tensioner and this valve displacement directs pressure fluid from the pressure source to the booster which assists in the steering operation.

The sleeve valve element surrounds the spool valve and is connected to a manual control whereby the vehicle operator can directly control the power steering valve to cause full power operation of the steering system as distinguished from a power assist function. Full power operation of the steering system is useful during certain maneuvers such as parking.

BRIEF DESCRIPTION OF THE DRAWINGS

The many objects and advantages of a motor vehicle steering device constructed in accordance with this invention will become apparent upon consideration of the following detailed description and the accompanying drawings, in which.

DETAILED DESCRIPTION OF THE PREFERRED EMBODIMENT

Figure 7:
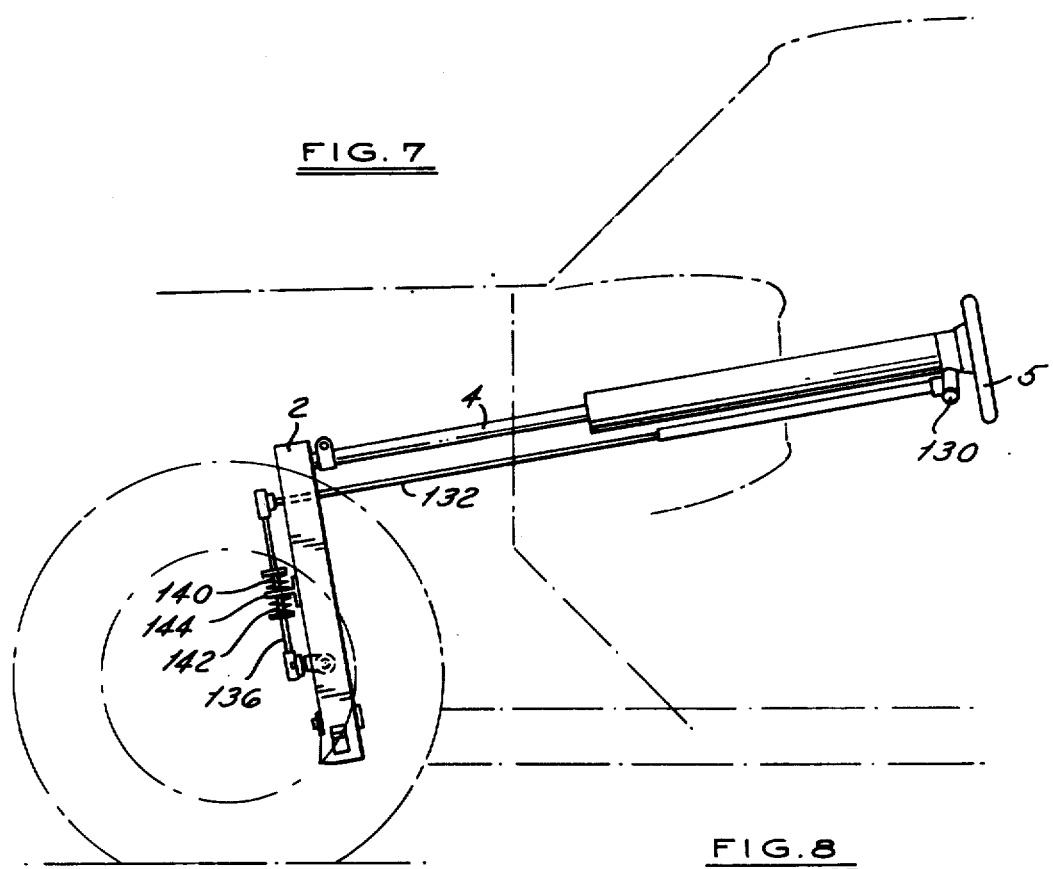
FIG. 7 is a schematic side elevational view of the steering system installed in a motor vehicle.
Figure 8:
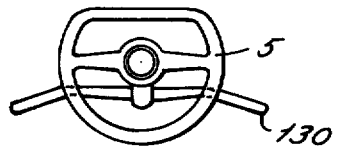
FIG. 8 is a rear elevational view of the steering wheel and manual steering valve control.
Figure 9:
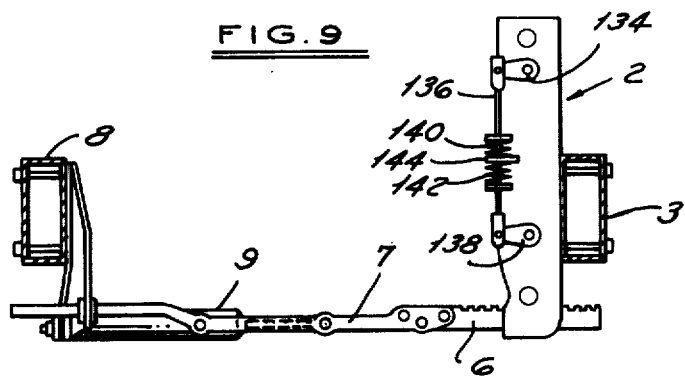
FIG. 9 is a front elevational view of the steering system of FIG. 7.

The presently preferred embodiment of this invention is shown in the drawings. Referring to FIG. 7, a motor vehicle 1 has a power steering system that includes a chain driven power steering gear assembly 2. The power steering gear assembly 2 is supported on the longitudinally extending frame side rail 3 of the vehicle 1. A steering shaft 4 is connected to the assembly 2 and has a steering wheel 5 secured to its rearward end.

The output member of the assembly 2 is a linearly displaceable toothed rack 6 that extends transversely of the vehicle. The rack 6 is connected to a link 7 of the vehicle's steering linkage system. Link 7 is slidably supported by a bracket connected to the right-hand frame side rail 8. A power steering booster cylinder 9 has one end supported on the bracket of the frame side rail 8 and a piston rod secured to the steering link 7. The booster cylinder 9 receives pressure fluid from a fluid pressure source (not shown) as directed by a power steering valve 80 that is situated within the steering assembly 2.

Figure 1:
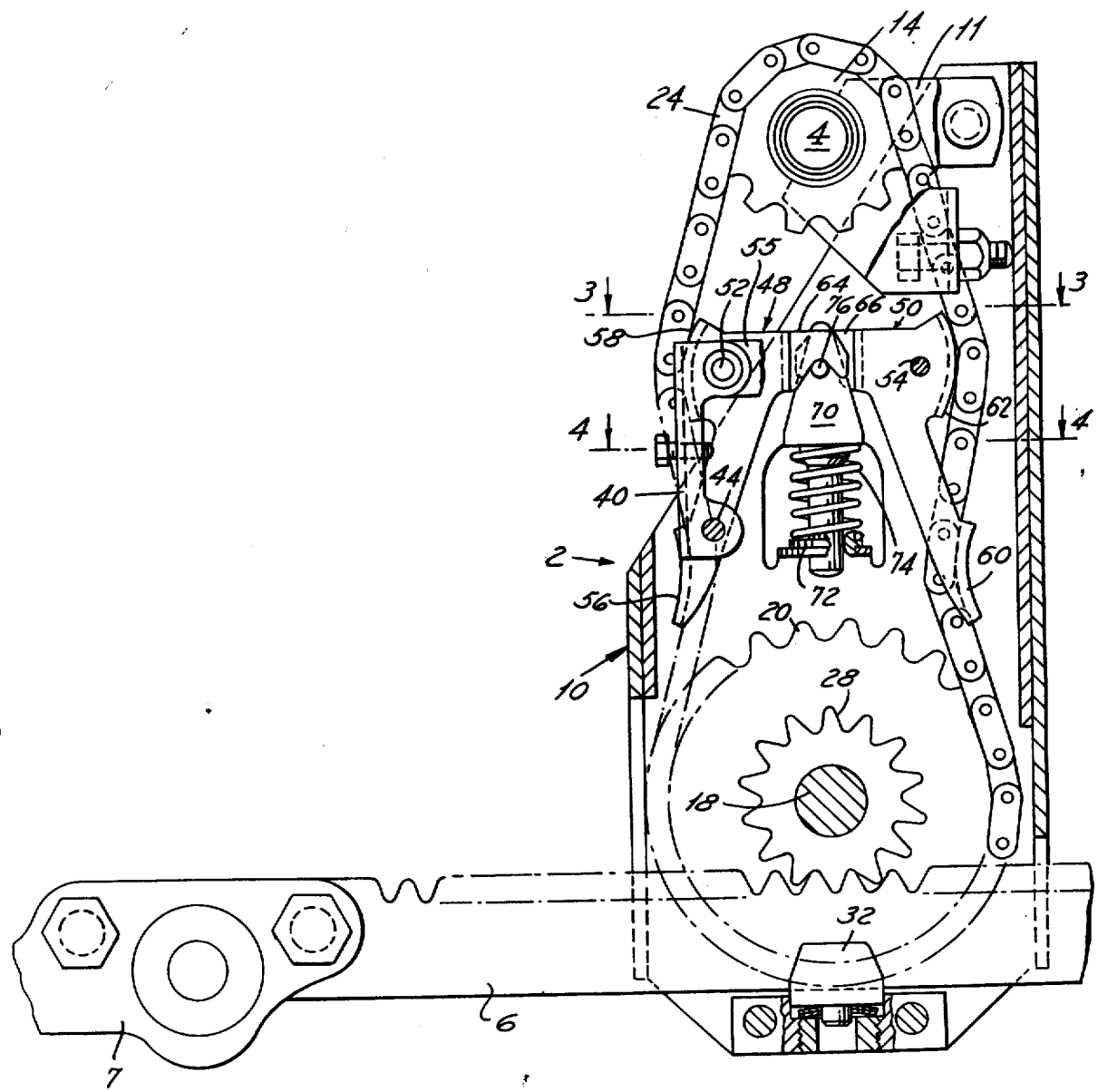
FIG. 1 is a front elevational view of a motor vehicle steering device constructed and arranged in accordance with this invention.
Figure 2:
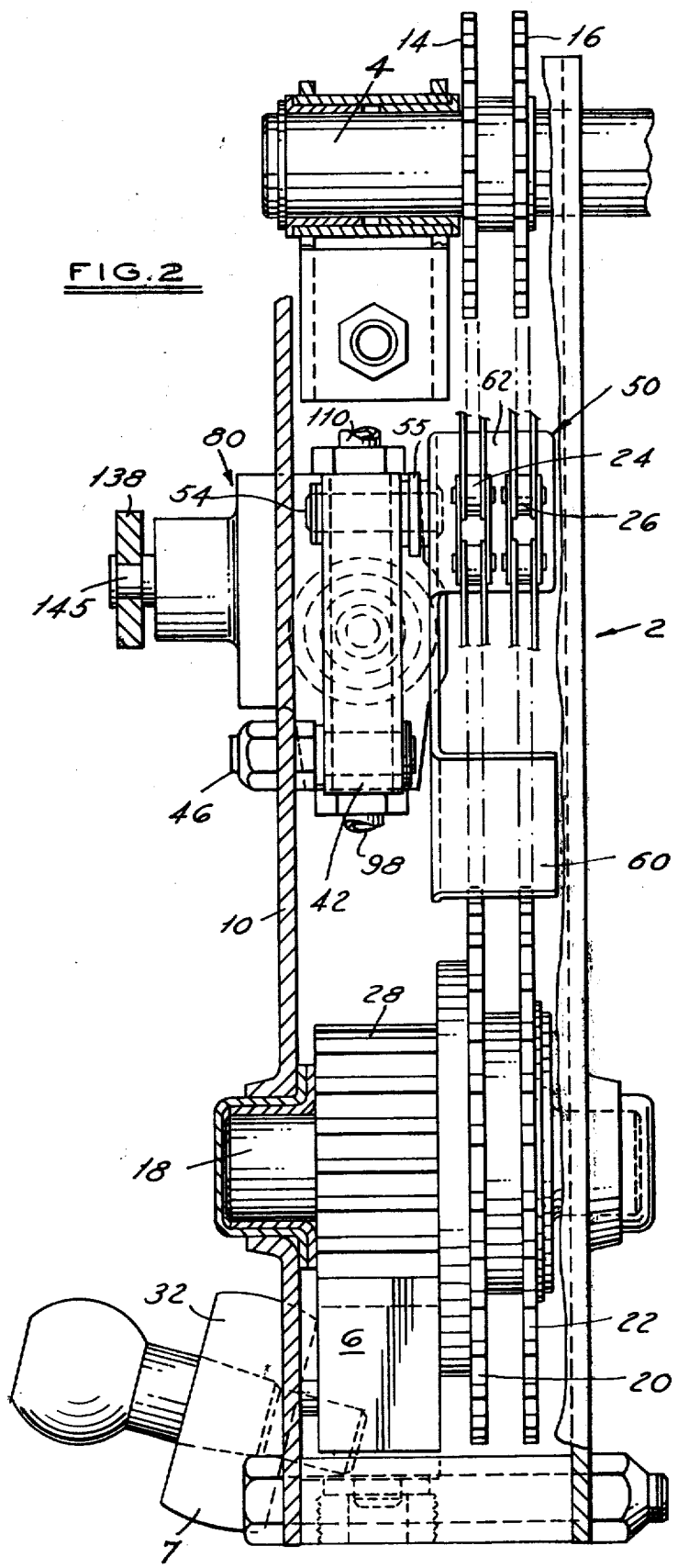
FIG. 2 is a side elevational view, partly in section, of the steering device of FIG. 1 with portions broken away to show the inner construction.

FIG. 1 illustrates the construction of the power steering assembly 2. It includes a housing 10 that is shown cutaway to expose the internal elements of the device. A bracket 11 is connected to the housing 10 and rotatably supports the forward end of the steering shaft 4. A pair of input sprockets 14 and 16 are secured to the steering shaft 4. A shaft 18 is rotatably mounted in the housing 10 and carries a pair of output sprockets 20 and 22. A pair of roller-type drive chains 24 and 26 drivingly interconnect the input sprockets 14, 16 with the output sprockets 20, 22.

A pinion 28 is rigidly affixed to the shaft 18 and engages the teeth of the rack 6. The pinion 28 and the rack 6 form the principal elements of a rack and pinion steering gear. A spring pressed wear compensator 32 urges the toothed rack 6 into meshed engagement with the pinion 28. The rack 6 is connected to the link 7 of the steering linkage system of the vehicle 1.

Figure 3:
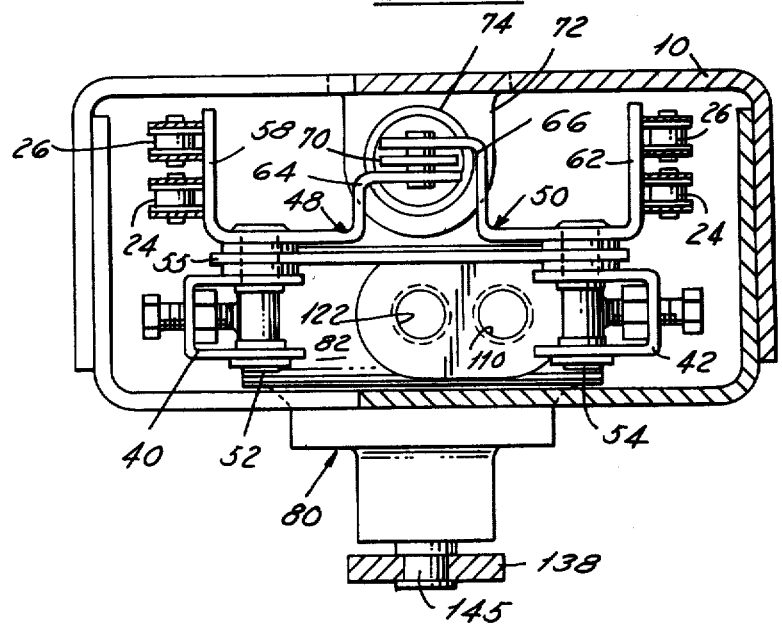
FIG. 3 is a sectional view taken along section line 3—3 of FIG. 1.
Figure 4:
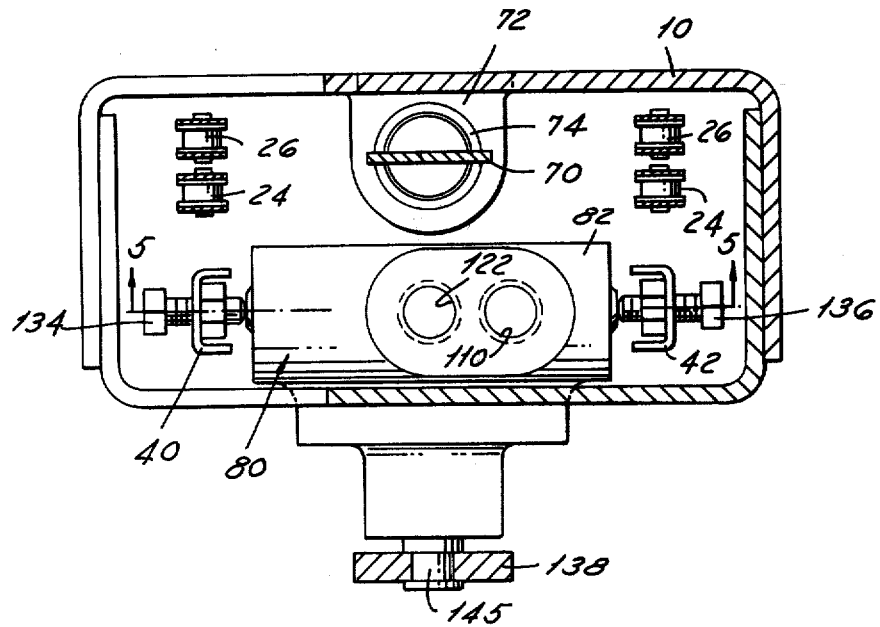
FIG. 4 is a sectional view taken along section line 4—4 of FIG. 1.

A resiliently mounted articulated chain tensioner engages portions of the roller chains 24, 26 located between the driving sprockets 14, 16 and the driven sprockets 20, 22. The tensioner functions to control slack in the chains. The chain tensioner is a linkage mechanism and includes a pair of upstanding links 40 and 42 that are connected to the housing at their lower ends by pivot pins 44 and 46. The upper ends of the upstanding links 40 and 42 are pivotally connected to a pair of L-shaped levers 48 and 50 by a pair of pivot pins 52 and 54. A cross link 55 interconnects the pivot pins 52 and 54 (see FIG. 3).

The L-shaped lever 48 has a depending leg with an arcuate portion 56 that faces inwardly and bears against adjacent portions of the chains 24, 26. The lever 48 has a second arcuate portion 58 that faces outwardly and bears against other portions of the chains 24, 26.

The two L-shaped lever members 48 and 50 have inwardly extending overlapping arms 64 and 66. An intermediate member 70 is supported in a flange portion 72 of the housing 10 and is urged upwardly by a coil spring 74. The upper end of the intermediate member 70 has a cross pin 76 that is seated in aligned notches in the overlapping arms 64, 66 of the L-shape levers 48, 50.

Spring 74 urges the intermediate member 70 upwardly and L-shaped lever 48 in a counterclockwise direction (as seen in FIG. 1) about the pivot pin 52. Similarly, the spring 74 urges the L-shape lever 50 in a clockwise direction about the pivot pin 54.

The biased engagement of the L-shape lever 48 with the portions of the chains 24, 26 spanning the gap between the two pairs of sprockets 14, 16 and 20, 22 urges the chains into an ogee configuration as seen in FIG. 1. Likewise, clockwise rotation of the lever 50 urged by the spring 74 will draw the portions of the chains 24, 26 engaged by the bearing surfaces 60 and 62 into an ogee curve.

The engagement of the levers 48 and 50 with the chains 24 and 26 under the force of spring 74 controls the slack in the chains.

When steering torque is transmitted from the input sprockets 14, 16 to the driven sprockets 20, 22 through the chains 24, 26, portions of the chains will be loaded in tension and will tend to straighten from their normal ogee curve. This will cause a lateral dislocation of the linkage elements that constitute the chain tensioner.

A hydraulic power steering valve 80 is provided in accordance with the present invention. The valve 80 is mounted in the housing 10 and is situated between the upstanding levers 40 and 42 of the chain tensioner. The valve 80 comprises a housing 82 having a central bore 84 in which a valve sleeve 86 is slidably supported. A spool valve element 88 is slidably within the sleeve 86. The spool valve 88 has a pair of protruding ends 90 and 92 of reduced diameter that are slidable within annular seals 94 and 96 that close the ends of the bore 84.

The housing 82 has an inlet port 98 that communicates with an annular groove 100 in the wall of the bore 84. The sleeve 86 has a slot 102 that is normally in communication with the groove 100.

A return port 104 is connected to an annular groove 106 in the surface of the bore 84 and it, in turn, is in alignment with a slot 108 in the sleeve 86 when the sleeve is in a central position.

A first outlet 110 in the valve housing 82 communicates with an annular groove 112 in the bore 84 which, in turn, is normally in alignment with a slot 114 in the valve sleeve 86. An internal passage 116 connects the outlet port 110 to an annular groove 118 in the bore 84 that is normally aligned with a slot 120 in the sleeve 86.

A second outlet port 122 of the valve 80 communicates with an annular groove 124 in the bore 84 and it, in turn, communicates with a slot 126 in the sleeve 86 when the sleeve is in a central position.

The spool valve element 88 has a pair of end lands 128 and 130 that are normally in alignment with the slots 114 and 120, respectively. A central land 132 on the spool valve element 88 is normally in alignment with the slot 126. The slot 126 is slightly wider than the land 132.

The inlet port 98 of the valve 80 is connected to a fluid pressure source (not shown) such as a power steering pump. The return port 104 is connected to the reservoir for the fluid pressure source.

The first and second outlet ports 110 and 122 of the valve 80 are connected to fluid pressure chambers situated on either side of the power piston within the booster cylinder 9. When the fluid under pressure is supplied to the booster cylinder 9 through port 110, a force is exerted upon the vehicle steering linkage that will urge the linkage and the vehicle's front wheels in a direction for a left-hand turn. Fluid pressure from the port 122 will cause the booster cylinder 9 to urge the steering linkage and the front wheels in a direction corresponding to a right-hand turn.

The valve 80 is an open center valve and during normal straight-ahead driving, fluid pressure supplied to the port 98 flows through the groove 100 and slot 102, through the slot 126 and past the periphery of the land 132, through the slot 108 and groove 106, and out the return port 104. Both outlet ports 110 and 122 are in communication with the return port 104 and, therefore, neither side of the booster cylinder 9 is pressurized.

The upstanding levers 40 and 42 of the chain tensioner have inwardly directed machine screws 134 and 136 which engage the exposed ends 90 and 92 of the spool valve 88.

When steering torque is applied to the steering device 2 by rotating the steering wheel 5 and load is transmitted from the driving sprockets 14, 16 to the driven sprockets 20, 22, portions of the chains 24, 26 are placed under a tension load. The load on the chains 24, 26 will tend to straighten out the chain portions under tension and, thereby, laterally displace the chain tensioner. The upstanding links 40, 42 will be pivoted a slight amount in the clockwise or counterclockwise direction depending upon the direction in which the driving sprockets 14, 16 are being rotated.

Figure 5:
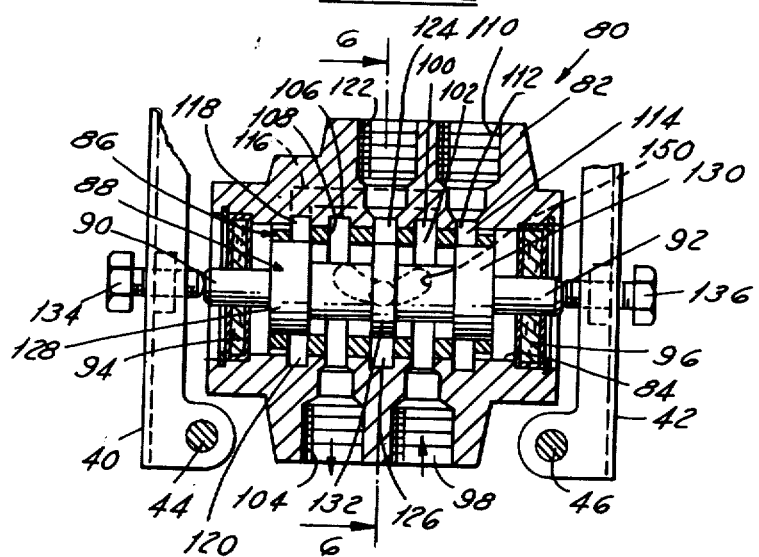
FIG. 5 is a sectional view taken along section line 5—5 of FIG. 4.

Looking at FIG. 5 which is a sectional view looking rearwardly of the valve 80, the spool valve element 88 will be shifted to the right in response to rotation of the steering wheel 5 for a left-hand turn. This movement corresponds to clockwise rotation of shaft 4 as seen in FIG. 1. Right-hand displacement of the spool valve element 88 will cause the land 132 to seal the previously open communication between the return port 104 and the pressure inlet port 98. Outlet 110 will be sealed off from the return port 104 by the valve lands 128 and 132.

Under these circumstances, pressure fluid will flow through the pressure inlet port 98, through the groove 100 and slot 102, through the slot 114 and groove 112, and out the outlet 110. Pressure fluid flowing through the outlet port 110 is conveyed to that side of the power booster cylinder 9 which will assist a turn in the left-hand direction.

Return fluid coming from the cylinder 9 due to the displacement of the power piston within the cylinder will flow through the outlet port 122, the groove 124, the slot 126, the slot 108, the groove 106 and through the return port 104 to the reservoir of the hydraulic pressure source.

When the spool valve 88 is shifted to the left (as seen in FIG. 5) in response to rotation of the steering wheel 5 for a right-hand turn, the chain portions on the right side of the sprockets (as seen in FIG. 1) will be loaded in tension. The chain tensioner will respond to this loading of the chains 24, 26 by causing leftward displacement of the valve element 88. When the valve element 88 is moved to the left, land 132 will seal off the previously open communication of the pressure inlet port 98 and of the outlet port 122 with the return port 104. When the valve parts are in this orientation, fluid pressure will flow through pressure inlet port 98, through the various slots and grooves, through outlet port 122 and to the power booster cylinder 9.

The outlet port 110 and the low pressure side of the power booster cylinder 9 will be placed in communication through the internal passage 116 with the return port 104 and the reservoir for the hydraulic system.

In accordance with the present invention, direct manually controlled means is provided for actuating the power steering valve 80.

A handle bar 130 is situated just forwardly of the steering wheel 5 and pivotally supported on the steering column. A shaft 132 extends forwardly from the handle bar 130 parallel to the steering shaft 4. The forward end of the shaft 132 is connected to a crank arm 134 pivotally supported on the housing 10. A connecting link 136 joins the crank arm 134 with a second crank 138. A pair of springs 140 and 142 supported by the connecting link 136 engage a stationary flange 144 secured to the housing 10. The pair of springs 140, 142 operate to urge the connecting link 136 to a central position.

Figure 6:
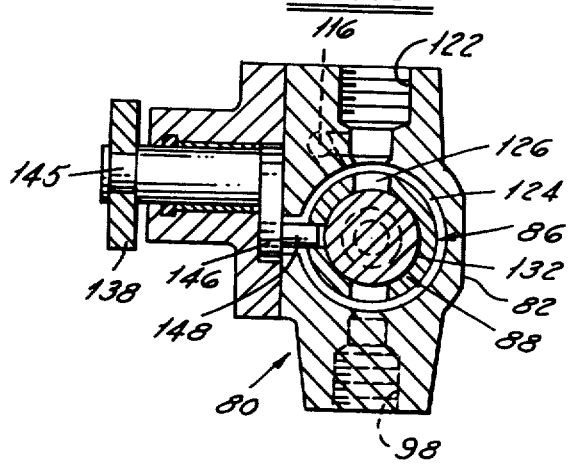
FIG. 6 is a sectional view taken along section line 6—6 of FIG. 5.

Referring to FIG. 6, the crank 138 is connected to a short shaft 145 rotatably supported in the housing 82 of the power steering valve 80. A lever arm 146 is connected to the inner end of the shaft 145 and supports a pin 148. The pin 148 extends inwardly and engages a hold in the sleeve valve element 126. A crescent-shape slot 150 is formed in the housing 82 to accommodate angular displacement of the lever arm 146 and pin 148.

With this construction the crank 138 and the parts connected thereto, including the pin 148, may be angularly displaced and thereby cause left or right lateral displacement of the sleeve valve element 86.

The handle bar 130 is constructed to be pivoted in either a clockwise or counterclockwise direction and its displacement transmitted through the shaft 132 and the connecting link 136 to the crank 138. Angular displacement of the crank 138 will cause the lever arm 146 and pin 148 to be similarly angularly displaced whereby the valve sleeve 86 will be laterally shifted in the bore 84. Shifting of the sleeve 86 in the bore 84 will produce a change in fluid flow corresponding to the effect caused by lateral displacement of the spool valve element 88.

Referring to FIG. 5, when the sleeve 88 is shifted to the right in response to displacement of the handle bar 130 in a clockwise direction (as viewed by the vehicle operator), the inlet port 98 and the outlet port 122 will each be sealed off from the return port 104. The outlet port 122 will be in communication with the pressure inlet port 98 whereby pressure fluid will be directed too one side of the power cylinder 9. The cylinder 9, in turn, will exert a force on the steering link 7 that will cause the front wheels to turn in the direction of a right-hand turn.

Shifting of the sleeve valve element 86 to the right will provide communication between the low pressure side of the pressure cylinder 9 through the valve port 110, internal passage 116 and return port 104 to the reservoir of the power steering hydraulic system.

Counterclockwise rotation of the handle bar 130 (again as viewed by the vehicle operator) will cause the sleeve-like valve element 86 to be shifted to the left (FIG. 5) whereby fluid pressure inlet 98 will be sealed off from return port 104. The outlet port 110 will also be sealed off from the return port 104. With the sleeve 86 in a leftward orientation, pressure fluid will flow from the pressure source, through the inlet port 98, through the various grooves and slots, out the outlet port 110 and to the other side of the cylinder 9.

The flow of fluid to the other side of the cylinder 9 will cause the piston therein to be displaced. Piston movement will force fluid in the low pressure side of the cylinder 9 to return to the reservoir through port 122 and out return port 104.

In response to the fluid pressure received through outlet port 110, the booster cylinder 9 will exert a force on the steering link 7 and will cause the vehicle's wheels to be angularly displaced in a direction appropriate for a left-hand turn.

SUMMARY

Therefore, in accordance with the present invention, the steering wheel 5 is rotatable either to the right or to the left to cause direct actuation of the rack and pinion steering gear by means of the drive chains 24, 26. The power steering valve 80 is actuated by the chain tensioner mechanism when a steering load is carried by the chains 24, 26 to convey pressure fluid to the power cylinder 9 which, in turn, provides a power assist to the lateral translation of the rack 6 and the steering link 7.

When the vehicle 1 is to be maneuvered at low speeds such as during parking, it may be advantageous to use the handle bar 130 to directly actuate the power steering valve 80. Movement of the handle bar 130 directly actuates the valve whereby pressure fluid is directed to one side or the other of the power cylinder 9 to effect a steering operation. In this situation, the steering is fully hydraulically powered as distinguished from manual steering with a hydraulic power assist.

The foregoing description presents the presently preferred embodiment of this invention. Modifications and alterations may occur to those skilled in the art which will come within the scope and spirit of the following claims.

I claim:

1. A power steering device for a motor vehicle comprising:

a driving sprocket constructed to be connected to a steering wheel, a driven sprocket constructed to be connected to a pinion gear, a chain drivingly interconnecting said driving sprocket and said driven sprocket, a laterally translatable toothed rack in meshed engagement with said pinion gear, said rack being constructed to be connected to an element of the steering linkage system of said motor vehicle, a chain tensioner means engaging said chain, said chain tensioner means being displaceable in response to the transmission of a force from said driving sprocket through said chain to said driven sprocket, a power steering valve having first and second valve control means, said first valve control means being actuatable in response to displacement of said tensioner means, said second valve control means being actuatable by means independent of said first valve control means and said tensioner means, said power steering valve being constructed to direct power steering fluid to a hydraulic motor that is arranged to apply a force to said element of said steering linkage system in response to the actuation of either said first or second valve control means.

2. A power steering device for a motor vehicle comprising:

a driving sprocket constructed to be connected to a steering wheel, a driven sprocket constructed to be connected to a pinion gear, a chain drivingly interconnecting said driving sprocket and said driven sprocket, a laterally translatable toothed rack in meshed engagement with said pinion gear, said rack being constructed to be connected to an element of the steering linkage system of said motor vehicle, a chain tensioner means engaging said chain, said chain tensioner means being displaceable in response to the transmission of a force from said driving sprocket through said chain to said driven sprocket, a power steering valve having a ported housing with a bore therein, a ported valve sleeve slidable in said bore, a landed spool valve element slidable in said ported sleeve, one of said spool valve element and sleeve being engageable by said chain tensioner means and displaceable in response to displacement of said tensioner means, manual control means connected to the other of said spool valve element and sleeve and directly displaceable by a manual control, said power steering valve being constructed to direct power steering fluid to a hydraulic motor that is arranged to apply a force to said element of said steering linkage system in response to the displacement of either said sleeve valve element or said spool valve.

* * * * *